US012689040B2

(12) United States Patent
Yuk et al.

(10) Patent No.: US 12,689,040 B2
(45) Date of Patent: Jul. 21, 2026

(54) MANUFACTURING METHOD OF A CATALYST FOR A FUEL CELL

(71) Applicants: HYUNDAI MOTOR COMPANY, Seoul (KR); KIA CORPORATION, Seoul (KR); THE INDUSTRY & ACADEMIC COOPERATION IN CHUNGNAM NATIONAL UNIVERSITY (IAC), Daejeon (KR)

(72) Inventors: Seongmin Yuk, Yongin-si (KR); Kookil Han, Seongnam-si (KR); Woo Yeong Noh, Seoul (KR); Namgee Jung, Daejeon (KR); Jiho Min, Daejeon (KR); Yunjin Kim, Sejong-si (KR); Keonwoo Ko, Gwangju (KR)

(73) Assignees: HYUNDAI MOTOR COMPANY, Seoul (KR); KIA CORPORATION, Seoul (KR); THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 557 days.

(21) Appl. No.: 18/204,134

(22) Filed: May 31, 2023

(65) Prior Publication Data

US 2024/0128475 A1 Apr. 18, 2024

(30) Foreign Application Priority Data

Oct. 17, 2022 (KR) ........................ 10-2022-0133029

(51) Int. Cl.
*H01M 4/92* (2006.01)

(52) U.S. Cl.
CPC ................................... *H01M 4/926* (2013.01)

(58) Field of Classification Search
CPC .......... H01M 4/926; H01M 2008/1095; Y02E 60/50
See application file for complete search history.

(56) References Cited

U.S. PATENT DOCUMENTS

| | | | |
|---|---|---|---|
| 4,137,373 A | 1/1979 | Jalan et al. | |
| 9,793,552 B2 | 10/2017 | Jang et al. | |
| 2015/0196897 A1 | 7/2015 | Jang et al. | |

FOREIGN PATENT DOCUMENTS

| | | | | |
|---|---|---|---|---|
| KR | 100480969 B1 | 4/2005 | | |
| KR | 101505572 B1 | 3/2015 | | |
| KR | 20200054587 A | 5/2020 | | |
| KR | 20210067176 A | * 6/2021 | .......... | H01M 4/8663 |
| KR | 102323270 B1 | 11/2021 | | |

(Continued)

OTHER PUBLICATIONS

Machine translation of KR20210067176. (Year: 2021).*

(Continued)

*Primary Examiner* — Brian A McCaig

(74) *Attorney, Agent, or Firm* — Lempia Summerfield Katz LLC

(57) ABSTRACT

A manufacturing method of a catalyst may modify a carbon layer structure by using various heat treatment gases such as inert gas (Ar), hydrogen, and carbon monoxide in a carbon layer manufacturing process, thereby optimizing the carbon layer structure according to the purpose of a metal without changing a size of the metal.

10 Claims, 7 Drawing Sheets

Clean Pt Surface

Carbon Etching Effect
$H_2$

Carbon-Incorporated Pt

Inert Gas | Ar

Additional Carbon Source
Co

Co | Defect Healing

Moderately Dense Carbon Shell

Extremely Dense Carbon Shell

Carbon Shell-Encapsulated Pt

Carbon Shell-Encapsulated Pt

(56) References Cited

FOREIGN PATENT DOCUMENTS

WO      WO-2017074667 A1 *   5/2017   ......... B01J 37/0018

OTHER PUBLICATIONS

Karuppannan, M., et al., 2019, Energy & Environmental Science, 12, 2820-2829. < DOI: 10.1039/c9ee01000a> (Year: 2019).*

Anthony R. Kucernak et al., Studying the oxygen reduction and hydrogen oxidation reactions under realistic fuel cell conditions, Electrochemistry Communications, vol. 10; 2008; pp. 1728-1731.

Kailong Hu et al., Graphene Layer Encapsulation of Non-Noble Metal Nanoparticles as Acid-Stable Hydrogen Evolution Catalysts, ACS Energy Letters, vol. 3; 2018; pp. 1539-1544.

Qi Hu et al., Crafting MoC2-doped bimetallic alloy nanoparticles encapsulated within N-doped graphene as roust bifunctional electrocatalysts for overall water splitting, Nano Energy, vol. 50; 2018; pp. 212-219.

Yi Yu et al., A review on performance degradation of proton exchange membrane fuel cells during startup and shutdown processes: Causes, consequences, and mitigation strategies, Journal of Power Sources, vol. 205; 2012; pp. 10-23.

* cited by examiner

MANUFACTURING METHOD OF A CATALYST FOR A FUEL CELL

CROSS-REFERENCE TO RELATED APPLICATION

This application claims under 35 U.S.C. § 119(a) the benefit of priority to Korean Patent Application No. 10-2022-0133029 filed on Oct. 17, 2022, the entire contents of which are incorporated herein by reference.

BACKGROUND

(a) Technical Field

The present disclosure relates to a manufacturing method of a catalyst for a fuel cell.

(b) Background Art

Various types of catalysts are being actively studied to improve the performance and durability of devices used in various energy material applications such as secondary batteries, fuel cells, and water electrolysis. Meanwhile, a catalyst for coating a carbon layer may be generally manufactured by coating a polymer on a metal nanoparticle and then carbonizing the same at a high temperature. However, growth of the metal nanoparticles can be suppressed by the excessive polymer coating in the manufacturing method using the carbonization process after the polymer coating. However, due to a feature of the polymer, it may be very difficult to control the thickness and porosity of the carbon layer in the carbonization process. Also, various restrictions may occur based on the structure and physical property of the polymer. For example, the carbon layer may have a very different structure based on polymer coating time, high-temperature carbonization process time, a molecular weight of the polymer, a chain length, or the like. Many difficulties may thus occur in manufacturing a customized carbon layer structure suitable for a user's application field.

SUMMARY OF THE DISCLOSURE

Therein view of the foregoing, there is a need to develop technology for precisely controlling an exposure level of a core of metal nanoparticles by changing density (e.g., pore or defect) of the carbon layer according to the purpose of the metal while coating the very thin carbon layer without changing a size of the metal particle.

An object of the present disclosure is to provide a catalyst manufactured by a method for freely modifying a structure of a carbon layer coated on a catalyst surface. A gas atmosphere in a heat treatment operation is changed during a process of manufacturing the catalyst coated with the very thin carbon layer of less than 1 nm by using only an organic ligand included in an active metal.

The objects of the present disclosure are not limited to the above-described objects. The objects of the present disclosure should be more clearly understood from the following description and may be realized by methods and combinations thereof set forth in the claims.

According to an embodiment of the present disclosure, a manufacturing method of a catalyst for a fuel cell includes (A) obtaining an intermediate, i.e., a component having a support and an active metal supported on the support and (B) obtaining a catalyst by heat-treating the component in a gas atmosphere. The gas atmosphere includes inert gas, nitrogen ($N_2$), hydrogen ($H_2$), carbon monoxide (CO), or any combination thereof. The catalyst includes the support, the active metal supported on the support, and a carbon layer coated on a surface of the active metal.

The component may be heat-treated in an argon gas atmosphere.

The component may be heat-treated in a mixed gas atmosphere comprising nitrogen and hydrogen.

The mixed gas atmosphere may comprise nitrogen and hydrogen at a volume ratio in a range of 80:20 to 95:5.

The component may be heat-treated in a carbon monoxide gas atmosphere.

The component may be heat-treated in a mixed gas atmosphere comprising argon and carbon monoxide.

The mixed gas atmosphere may comprise argon and carbon monoxide at a volume ratio in a range of 90:10 to 99:1.

The operation (B) may further include: (B-1) primarily heat-treating the component in the gas atmosphere that comprises inert gas, nitrogen ($N_2$), hydrogen ($H_2$), carbon monoxide (CO), or any combination thereof. The operation (B) may further include (B-2) secondarily heat-treating the primarily heat-treated component in the gas atmosphere that comprises inert gas, nitrogen ($N_2$), hydrogen ($H_2$), carbon monoxide (CO), or any combination thereof.

The gas atmosphere in primatily heat-treating (B-1) may be a mixed gas atmosphere of nitrogen and hydrogen. The gas atmosphere in secondarily heat-treating (B-2) may be carbon monoxide.

The mixed gas atmosphere may comprise nitrogen and hydrogen at a volume ratio in a range of 80:20 to 95:5.

The catalyst may have a particle diameter in a range of 3 nm to 5 nm obtained from Scherrer's equation by using a half width of a peak with respect to a plane 220 of an X-ray diffraction spectrum.

The catalyst may have an exposed metal surface area (EMSA) in a range of 0.1 $m^2/g_{pt}$ to 25 $m^2/g_{pt}$.

The catalyst may have catalyst activity in an oxygen reduction reaction (ORR) in a range of 0.1V to 0.7V based on –1.5 $mA/cm^2_{gco}$.

The catalyst may have mass activity in a hydrogen oxidation reaction (HOR) in a range of 0.5 $mA/cm^2_{gco}$ to 2.0 $mA/cm^2_{gco}$ based on 0.02V.

The catalyst according to the present disclosure may modify the carbon layer structure by using the various heat treatment gases, thus having an optimized carbon layer structure according to the purpose of the metal without changing the size of the metal.

The effects of the present disclosure are not limited to the above-mentioned effects. It should be understood that the effects of the present disclosure include all effects that may be inferred from the description below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

Figure 1:
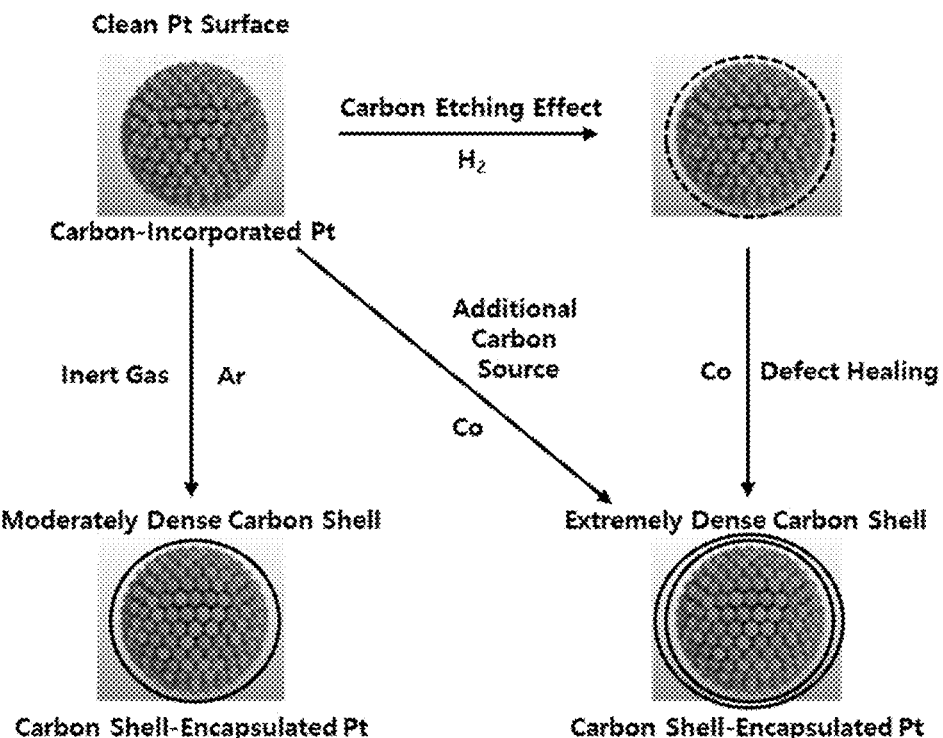
FIG. 1 schematically shows that a carbon layer of the present disclosure is heat-treated in various gas atmospheres to have various structures.

It should be understood that the appended drawings are not necessarily drawn to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawings.

DETAILED DESCRIPTION

The objects, other objects, features, and advantages of the present disclosure described herein should be more readily understood through the following embodiments in conjunction with the accompanying drawings. However, the present disclosure is not limited to the embodiments described herein, and may also be embodied in other forms. Rather, the embodiments introduced herein are provided to make the disclosed contents thorough and complete and to sufficiently convey the spirit of the present disclosure to those of ordinary skill in the art.

In describing each drawing, like reference numerals are used to refer to like components. In the accompanying drawings, the dimensions of the structures are exaggerated compared to the actual dimensions for clarity of the present disclosure. Terms such as "first" and "second" may be used to describe various components, and the components are not to be interpreted as being limited by the terms. The terms are used only to distinguish one component from another component. For example, a "first" component may be named a "second" component and the "second" component may also be similarly named the "first" component, without departing from the scope of the present disclosure. A term or aspect of a singular number or form may include its plural number or form unless explicitly indicated otherwise in context.

It should be understood that terms "include" or "have" used in this specification specify the presence of features, numerals, steps, operations, components, parts, or combinations thereof mentioned in the specification, and do not preclude the presence or addition of one or more other features, numerals, steps, operations, components, parts, or combinations thereof. In addition, when an element, such as a layer, a film, a region, or a substrate is referred to as being "on" another element, the element may be "directly on" another element or may have still another element interposed therebetween. On the other hand, when an element such as a layer, a film, a region, or a substrate is referred to as being "under" another element, the element may be "directly under" another element or may have still another element interposed therebetween.

Unless otherwise specified, it should be understood that all numbers, values, and/or expressions expressing ingredients, reaction conditions, polymer compositions, and amounts of formulations used herein are each modified by a term "about" in all cases, whether the term "about" is present or not. These numbers are essentially approximations reflecting various uncertainties of measurements that may occur in obtaining such values among others. Further, when a numerical range is disclosed in the present disclosure, such a range may be continuous and include all values inclusive from the minimum to the maximum in the range, unless otherwise indicated. Furthermore, when the range refers to an integer, the integer may include all integers inclusive from the minimum to maximum thereof, unless otherwise indicated.

A manufacturing method of a catalyst for a fuel cell according to the present disclosure is disclosed and described herein. The method comprises an operation (A) of obtaining a component including a support and an active metal supported on the support and an operation (B) of obtaining a catalyst by heat-treating the component in a gas atmosphere. The gas atmosphere may include at least one selected from a group consisting of, or may include, inert gas, nitrogen ($N_2$), hydrogen ($H_2$), carbon monoxide (CO), or any combination thereof. The catalyst may include the support, the active metal supported on the support, and a carbon layer coated on a surface of the active metal.

The operation (A) is an operation of obtaining the component including the support and the active metal supported on the support.

FIG. 1 schematically shows that the carbon layer of the present disclosure is heat-treated in various gas atmospheres to have various structures. Referring to FIG. 1 above, according to the present disclosure, it is possible to optimize a carbon layer structure according to the purpose of a metal, without changing a size of the metal, by forming the carbon layer by only supplying a small amount of carbon through using an organic ligand included in the active metal without an additional carbon source, and by heat-treating the carbon layer in the various gas atmospheres in this process to modify its structure.

The support may use a carbon support such as carbon black, carbon nanotubes, graphene, a reduction product of graphene oxide, amorphous carbon, or the like, and is not limited thereto.

For example, the active metal may be platinum or an alloy of platinum including ruthenium (Ru), palladium (Pd), cobalt (CO), iron (Fe), copper (Cu), or nickel (Ni). The selected active metal may improve hydrogen oxidation reaction of platinum and is not limited to these examples.

The active metal may include a free ligand. For example, the organic ligand may be β-diketone such as acetylacetonate (acac), but is not limited thereto. The organic ligand may be any one including a carbon source and capable of being reduced to the active metal by thermal decomposition.

The operation (B) is an operation of obtaining the catalyst by heat-treating the component in the various gas atmospheres. The gas atmosphere may include at least one selected from the group consisting of, or may include, inert gas, nitrogen ($N_2$), hydrogen ($H_2$), carbon monoxide (CO), or any combination thereof.

For example, the component may be heat-treated in an inert gas such as in an argon atmosphere.

When heat-treated in the argon atmosphere, the component may be heated-up to a temperature in a range of 700° C. to 1200° C. for 1 hour to 2 hours, and then may be heat-treated at a temperature in the range of 700° C. to 1200° C. for 30 minutes to 2 hours.

When the component is heat-treated in the argon atmosphere as described above, carbon included in the component may be moved to a catalyst surface to form a porous carbon layer. A catalyst is obtained thereby including a high-density carbon layer formed due to improved crystallinity.

For another example, the component may be heat-treated in a mixed gas atmosphere including nitrogen and hydrogen.

The mixed gas atmosphere may include nitrogen and hydrogen at a volume ratio in a range of 80:20 to 95:5. The porous carbon layer may not be manufactured when the volume ratio of the hydrogen is too small. The carbon layer may be removed when the volume ratio of hydrogen is excessive.

When heat-treated in the mixed gas atmosphere, the component may be heated-up to a temperature in the range of 700° C. to 1200° C. for 1 hour to 2 hours, and then may be heat-treated at a temperature in the range of 700° C. to 1200° C. for 30 minutes to 2 hours.

When heat-treated in the mixed gas atmosphere including nitrogen and hydrogen as described above, the carbon layer may be H-terminated and etched by hydrogen to have defective crystallinity. Accordingly, pores may be formed in the carbon layer, and the catalyst may thus obtain the porous carbon layer.

For still another example, the component may be heat-treated in a carbon monoxide atmosphere.

When heat-treated in the carbon monoxide atmosphere, the component may be heated-up to a temperature in the range of 700° C. to 1200° C. for 1 hour to 2 hours, and then may be heat-treated at a temperature in the range of 700° C. to 1200° C. for 30 minutes to 2 hours.

When the component is heat-treated in the carbon monoxide atmosphere as described above, carbon monoxide may supply the additional carbon source to the carbon layer to thus have a more dense structure by a defect healing effect. A catalyst is thereby obtained including an ultra-high-density carbon layer.

For yet another example, the component may be heat-treated in a mixed gas atmosphere including argon and carbon monoxide.

The mixed gas atmosphere may include argon and carbon monoxide at a volume ratio in the range of 90:10 to 99:1. Catalyst activity in an oxygen reduction reaction (ORR) may be excessively high by including a low-density carbon layer when the volume ratio of the carbon monoxide is too small. Catalyst activity in a hydrogen oxidation reaction (HOR) may be too low by including the ultra-high-density carbon layer when the volume ratio of the carbon monoxide is excessive.

When heat-treated in the mixed gas atmosphere, the component may be heated-up to a temperature in the range of 700° C. to 1200° C. for 1 hour to 2 hours, and then may be heat-treated at a temperature in the range of 700° C. to 1200° C. for 30 minutes to 2 hours.

When the component is heat-treated in the mixed gas atmosphere including argon and carbon monoxide as described above, it is possible to obtain a catalyst including the carbon layer whose density is controlled by supplying the additional carbon source or controlling its concentration.

The operation (B) may include an operation (B-1) that includes primarily heat-treating the component in the gas atmosphere. The gas atmosphere may including at least one selected from the group consisting of, or may include, inert gas, nitrogen ($N_2$), hydrogen ($H_2$), carbon monoxide (CO), or any combination thereof. The operation (b) may also include an operation (B-2) that includes secondarily heat-treating the primarily heat-treated component in the gas atmosphere. The gas atmosphere may include at least one selected from the group consisting of, or may include, inert gas, nitrogen ($N_2$), hydrogen ($H_2$), carbon monoxide (CO), or any combination thereof.

The component may be heat-treated in the mixed gas atmosphere of nitrogen and hydrogen in operation (B-1), and may be heat-treated in the carbon monoxide atmosphere in (B-2).

The mixed gas atmosphere may include nitrogen and hydrogen at a volume ratio in the range of 80:20 to 95:5. The porous carbon layer may not be manufactured when the volume ratio of the hydrogen is too small. The carbon layer may be removed when the volume ratio of hydrogen is excessive.

The primary heat treatment in operation (B-1) may be performed at a temperature in the range of 700° C. to 1200° C. for 30 minutes to 2 hours after heating up the component to a temperature in the range of 700° C. to 1200° C. for 1 hour to 2 hours. The secondary heat treatment in operation (B-2) may be performed at a temperature in the range of 700° C. to 1200° C. for 30 minutes to 2 hours after heating up the component to a temperature in the range of 700° C. to 1200° C. for 1 hour to 2 hours.

When heat-treated in the mixed gas atmosphere including nitrogen and hydrogen as in operation (B-1), the carbon layer may be H-terminated and etched by hydrogen to have defective crystallinity. Accordingly, pores may be formed in the carbon layer, thus obtaining the porous carbon layer. The primarily heat-treated component including the porous carbon layer may be heat-treated in the carbon monoxide atmosphere. In this case, the porous carbon layer may be modified into the high-density carbon layer to thus reduce the oxygen reduction reaction (ORR) and maintain the hydrogen oxidation reaction (HOR).

According to the present disclosure, it is thus possible to implement the carbon layer of various structures by changing only the gas atmosphere in the heat treatment process as described above. Thus, it is also possible to freely control an exposed surface area of the catalyst based on a purpose of use.

The catalyst according to the present disclosure may include the support, the active metal supported on the support, and the carbon layer coated on the surface of the active metal.

The catalyst may have a particle diameter in the range of 3 nm to 5 nm obtained from Scherrer's equation by using a half width of a peak with respect to a plane 220 of an X-ray diffraction spectrum.

The catalyst may have an exposed metal surface area (EMSA) in the range of 0.1 $m^2/g_{pt}$ to 25 $m^2/g_{pt}$.

The catalyst may have catalyst activity in the oxygen reduction reaction (ORR) in the range of 0.1V to 0.7V based on −1.5 $mA/cm^2_{gco}$.

The catalyst may have mass activity in the hydrogen oxidation reaction (HOR) in the range of 0.5 $mA/cm^2_{gco}$ to 2.0 $mA/cm^2_{gco}$ based on 0.02V.

Hereinafter, the present disclosure is described in detail with reference to the following manufacturing examples and experimental examples. However, the technical spirit of the present disclosure is not limited or restricted thereby.

Manufacturing Example: Manufacturing Catalyst

A first solution is obtained by adding 0.1 g of carbon powder (or carbon black (Vulcan XC72, Cabot)) and 5 ml of oleylamine (70%, Sigma-Aldrich) to 147 ml of 1-octadecene (90%, Sigma-Aldrich) and dispersing the same by using an ultrasound for 20 minutes. A second solution is obtained by adding 0.0509 g of Pt(actylactonate)$_2$(Platinum acetylaceto-nate, 97%, Sigma-Aldrich) and 5 ml of oleylamine (70%, Sigma-Aldrich) to 13 ml of 1-octadecene (90%, Sigma-Aldrich) and dispersing the same by using the ultrasound for 20 minutes. A mixed solution is obtained by mixing the first solution and the second solution with each other and dispersing the same by using the ultrasound for 5 minutes. The mixed solution is heated up to 120° C. for 1 hour in the argon (Ar) atmosphere and stirred. The mixed solution is then heated up to 300° C. for 2 hours in the argon (Ar) atmosphere and stirred. The mixed solution heated to 300° C. is cooled down to 80° C. and is then filtered and washed. In one example, the mixed solution is washed with 500 ml of hexane (95.0%, Samchun Pure Chemical) and 500 ml of ethanol (95.0%, Samchun Pure Chemical)). A component is obtained by pulverizing the dried result by using a mortar and bowl.

A catalyst identified as Pt@C/C Ar may refer to a catalyst manufactured by heating the component up to 900° C. for 1 hour and 30 minutes in the argon gas atmosphere and then by heat-treating the same at 900° C. for 1 hour.

A catalyst identified as Pt@C/C H$_2$ may refer to a catalyst manufactured by heating the component up to 900° C. for 1 hour and 30 minutes in a mixed gas atmosphere including nitrogen and hydrogen at a volume ratio of 80:20 to 95:5 and then by heat-treating the same at 900° C. for 1 hour.

A catalyst identified as Pt@C/C CO may refer to a catalyst manufactured by heating the component up to 900° C. for 1 hour and 30 minutes in a carbon monoxide atmosphere and then by heat-treating the same at 900° C. for 1 hour.

A catalyst identified as Pt@C/C CO 5%/Ar 95% may refer to a catalyst manufactured by heating the component up to 900° C. for 1 hour and 30 minutes in a mixed gas atmosphere including argon and carbon monoxide at a volume ratio of 90:10 to 99:1 and then by heat-treating the same at 900° C. for 1 hour.

A catalyst identified as Pt@C/C H$_2$$_{re}$CO may refer to a catalyst manufactured by heating the component up to 900° C. for 1 hour and 30 minutes in a mixed gas atmosphere including nitrogen and hydrogen at a volume ratio of 80:20 to 95:5, then by primarily heat-treating the same at 900° C. for 1 hour, by heating the primarily heat-treated component up to 900° C. for 1 hour and 30 minutes in the carbon monoxide atmosphere, and then by heat-treating the same at 900° C. for 1 hour.

Experimental Example 1: Check (Carbon Layer) Structure of Catalyst by Using TEM An experiment was performed using a transmission electron microscope (TEM) to check the carbon layers formed in the various heat-treatment gas atmospheres. A Tecnai G$^2$ F30 S-Twin equipment was used.

Figure 2:
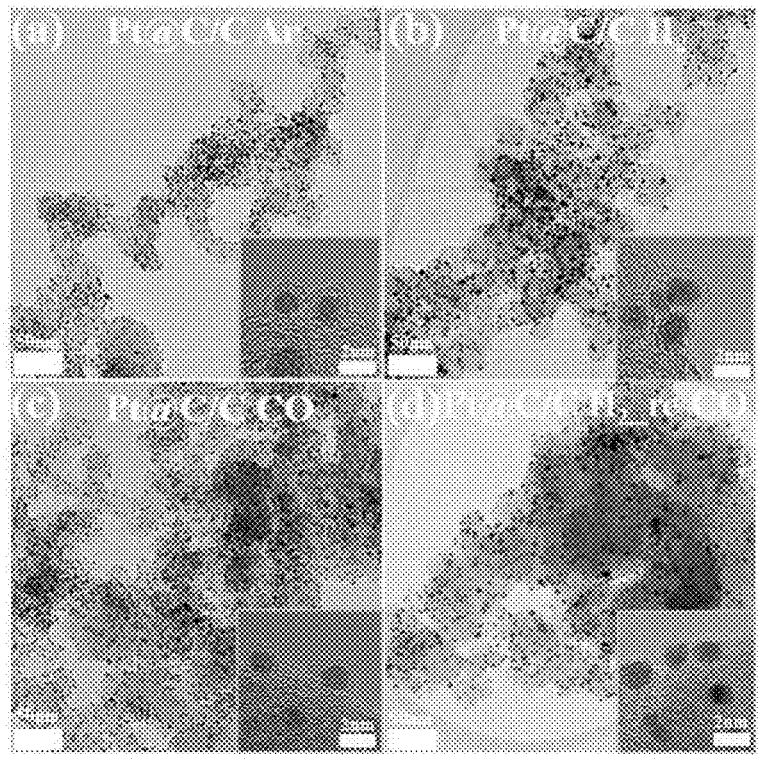
FIG. 2 shows views (a)-(d) each of a transmission electron microscope (TEM) image of a catalyst according to a manufacturing example of the present disclosure.

Each view (a)-(d) of FIG. 2 shows a transmission electron microscope (TEM) image of the catalyst according to an embodiment of the present disclosure.

Referring to FIG. 2, it may be seen that all of Pt@C/C Ar, Pt@C/C H$_2$, Pt@C/C CO, and Pt@C/C H$_2$$_{re}$CO have a carbon layer that does not exist in an existing commercial catalyst. In addition, it may be seen that all of the catalysts have an average particle size of about 4 nm.

Experimental Example 2: Check Crystal Phase of Catalyst by Using XRD Analysis An experiment was performed to check and analyze an X-ray diffraction (XRD) pattern of the manufactured catalyst in the various heat-treatment gas atmospheres. The XRD was analyzed using D/MAX-2200 Ultima/PC equipment, an X-ray light source was operated at 20 to 60 kV and 2 to 80 mA, and a Cu kα light source was used. Measurement was performed at room temperature of 15° C. to 25° C. at a scan rate of 1°/min at 20° to 80°.

Figure 3:
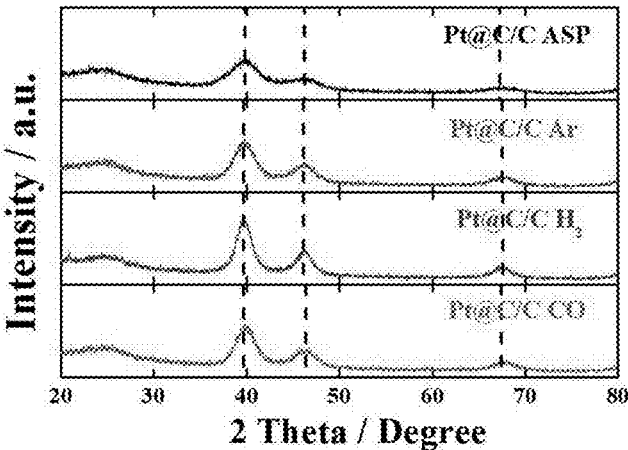
FIG. 3 shows an X-ray diffraction (XRD) pattern obtained by measuring the catalyst according to the manufacturing example of the present disclosure.

FIG. 3 shows the X-ray diffraction (XRD) pattern obtained by measuring the catalyst according to an embodiment of the present disclosure. Referring to FIG. 3, Pt peaks of Pt@C/C Ar, Pt@C/C H$_2$, Pt@C/C CO, and Pt@C/C H$_2$$_{re}$CO coincide with a Pt peak of an existing catalyst Pt@C/C ASP in an intermediate operation before the heat-treatment at 900° C. In addition, it may be seen that the catalyst has the particle diameter of about 4 nm obtained from Scherrer's equation by using the half width of a peak with respect to the plane 220 of the X-ray diffraction spectrum.

Experimental Example 3: Check Average Particle Size of Catalyst and Change in Exposed Metal Surface Area (EMSA)

An experiment was performed to check the average particle size of the catalyst and the change in the exposed metal surface area. A catalyst-coated RDE electrode was placed in an electrolyte including 0.1 M of perchloric acid (HClO$_4$) saturated with Ar at the room temperature. Carbon monoxide (CO) was then injected into the electrolyte to poison the catalyst. The exposed metal surface area was then calculated by measuring an amount of poisoned CO through cyclic voltammetry (CV). Here, the cyclic voltammetry has a scan rate of 20 mV/s.

Figure 4:
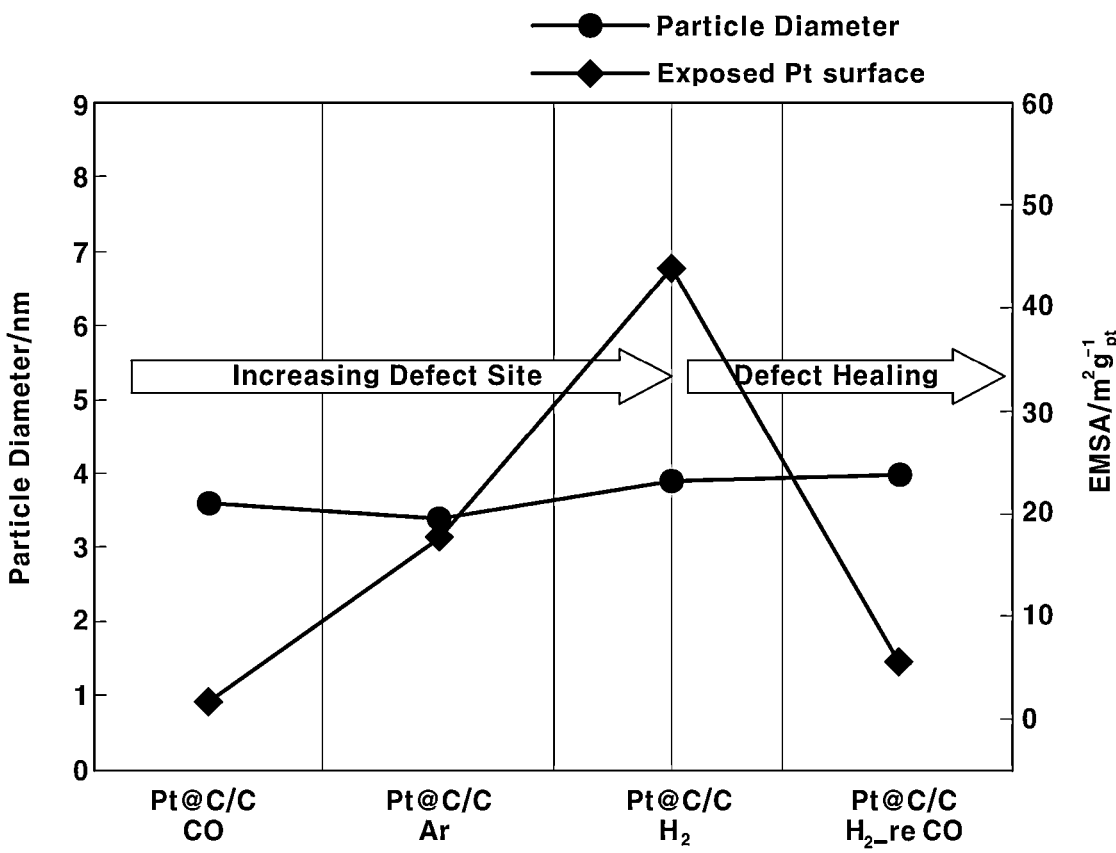
FIG. 4 shows an average particle size of the catalyst and a change in its exposed metal surface area according to an embodiment of the present disclosure.

FIG. 4 shows the average particle size of the catalyst and the change in its exposed metal surface area according to an embodiment of the present disclosure. Referring to FIG. 4, it may be seen that a typical catalyst may have the exposed metal surface area determined by a particle size thereof, whereas the catalyst according to an embodiment of the present disclosure may have the exposed metal surface area controlled by using the carbon layer manufactured based on the heat-treatment gas condition while having the same average particle size. It may be seen that the exposed metal surface area was greatly reduced due to the ultra-high-density carbon layer formed when the heat treatment is performed in the CO condition. The exposed metal surface area was increased due to the change in the density of the carbon layer when the heat treatment is performed in the Ar and H$_2$ condition. In addition, it may be seen that the exposed metal surface area of the catalyst may be decreased through the additional heat-treatment in the CO condition even after increasing the exposed metal surface area through the heat-treatment in the H$_2$ condition.

Experimental Example 4: Check Electrochemical Property of Catalyst Heat-Treated in Gas Atmosphere (CO 5%/Ar 95%) Including Very Small Amount of Carbon Monoxide An experiment was performed to check the electrochemical property of Pt@C/C H$_2$$_{re}$CO, which is the catalyst additionally heat-treated in the gas atmosphere including the very small amount of carbon monoxide. An electrochemical workstation and Autolab equipment were used. The electrochemical analysis of CV and CO stripping curves was performed using an electrolyte including 0.1 mole (M) of $HClO_4$ saturated with Ar at the room temperature. An evaluation on the catalyst activity in the electrochemical hydrogen oxidation reaction was performed using an electrolyte including 0.1 M of $HClO_4$ saturated with hydrogen at the room temperature. An evaluation on the catalyst activity in the electrochemical oxygen reduction reaction was performed using an electrolyte including 0.1 M of $HClO_4$ saturated with oxygen at the room temperature. A rotation speed of the RDE electrode was 1600 rpm, and a voltage scan rate was 5 mV/s when performing the evaluation on the catalyst activity in the hydrogen oxidation reaction or the oxygen reduction reaction.

Figure 5A:
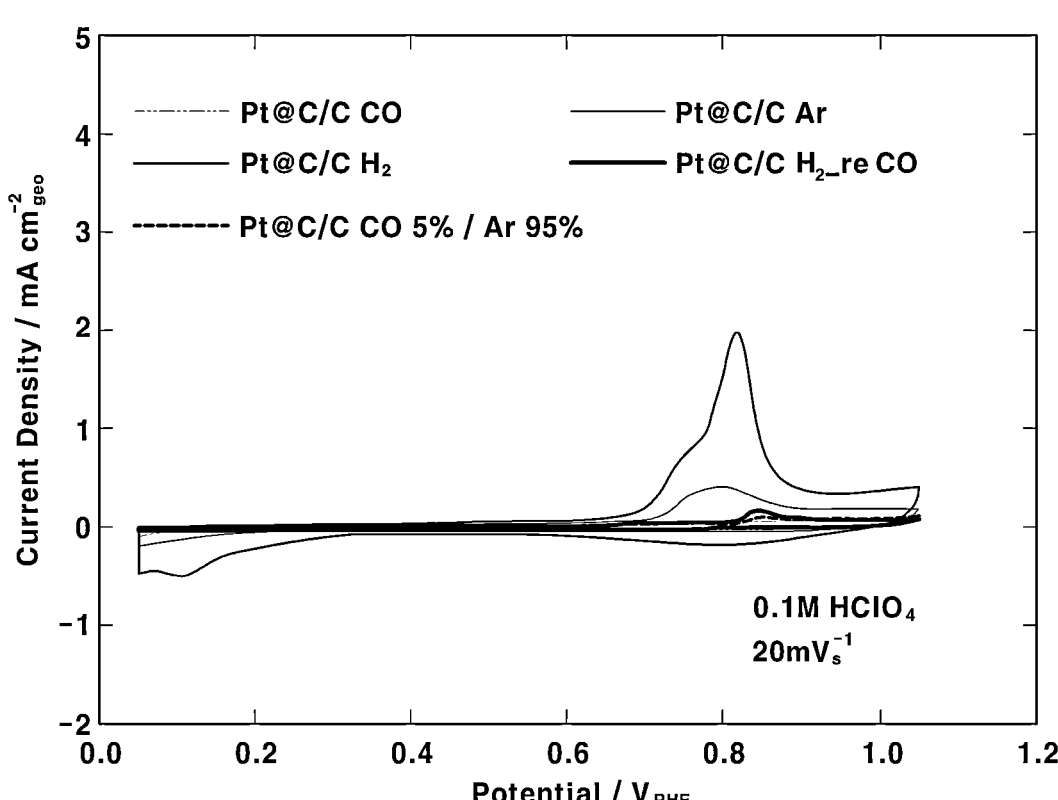
FIG. 5A shows a carbon monoxide (CO) stripping curve of the catalyst according to an embodiment of the present disclosure.
Figure 5B:
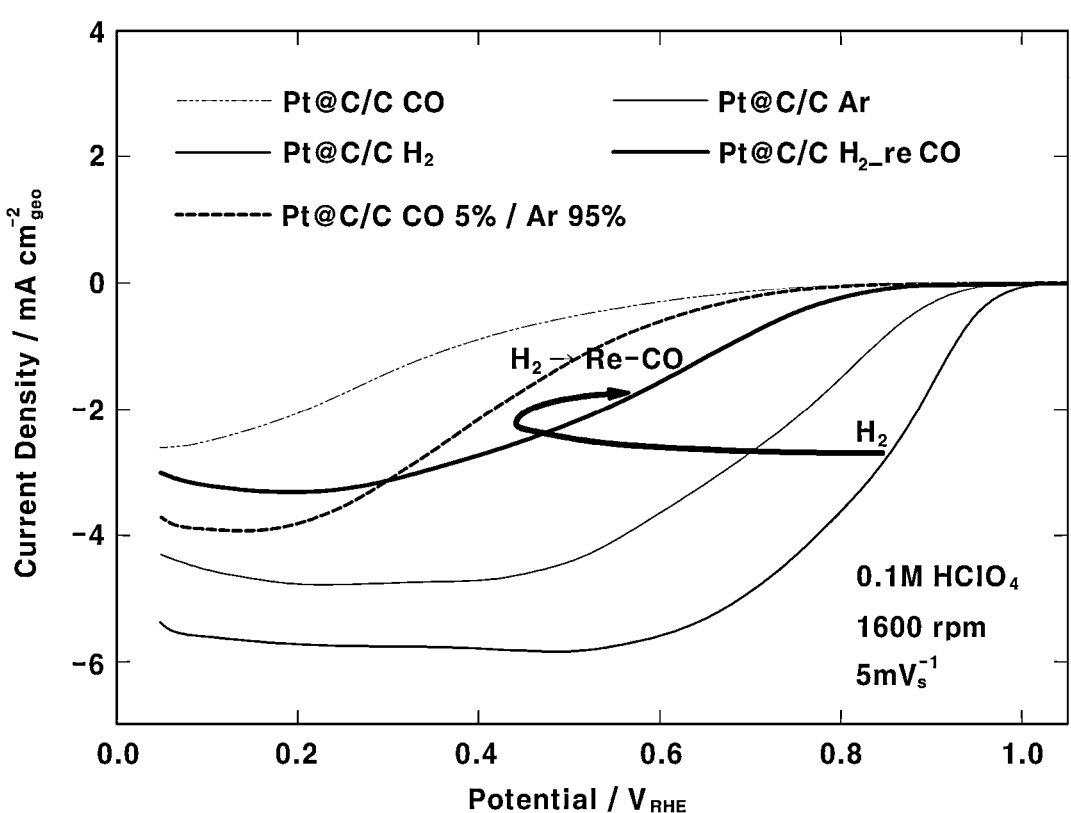
FIG. 5B shows catalyst activity in an oxygen reduction reaction (ORR) according to an embodiment of the present disclosure.
Figure 5C:
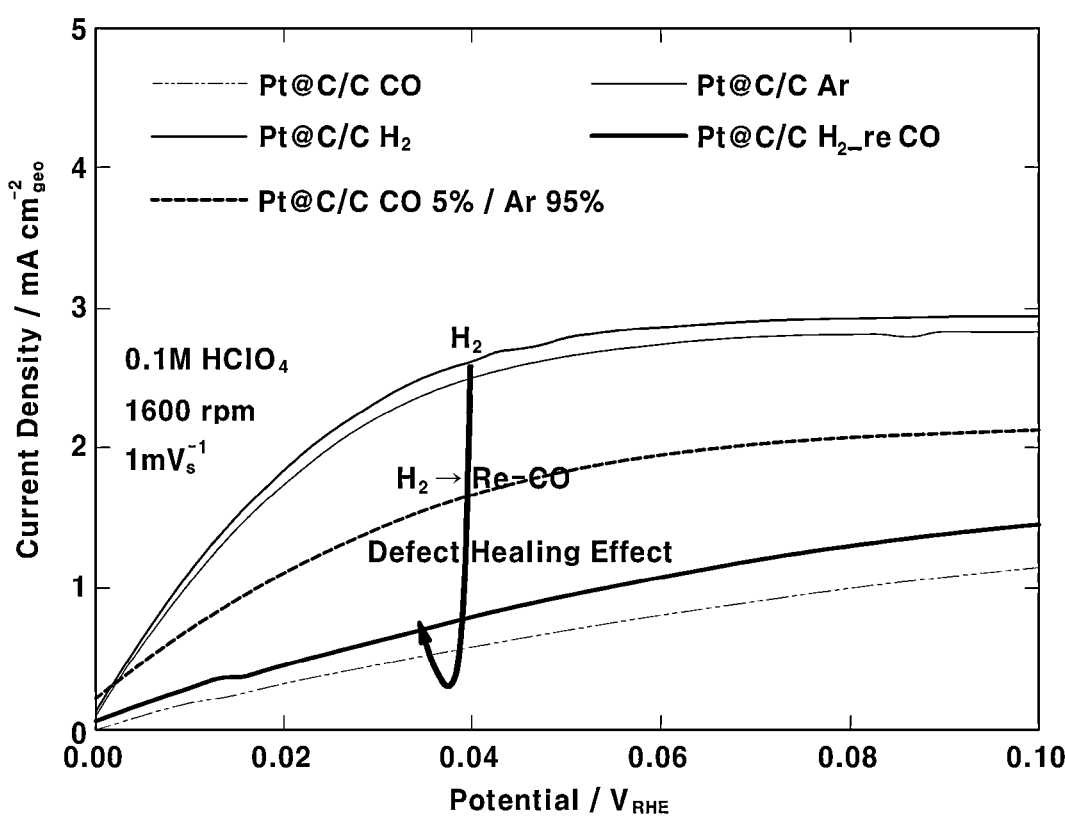
FIG. 5C shows catalyst activity in a hydrogen oxidation reaction (HOR) according to an embodiment of the present disclosure.

FIG. 5A shows the carbon monoxide (CO) stripping curve of the catalyst according to an embodiment of the present disclosure. FIG. 5B shows the catalyst activity in the oxygen reduction reaction (ORR) according to an embodiment of the present disclosure. FIG. 5C shows the catalyst activity in the hydrogen oxidation reaction (HOR) according to an embodiment of the present disclosure. Referring to FIGS. 5A, 5B, and 5C, Pt@C/C $H_{2\_re}$ CO that is manufactured by secondarily heat-treating Pt@C/C $H_2$ in a high-purity carbon monoxide atmosphere shows a lower activity in the oxygen reduction reaction (ORR) or the hydrogen oxidation reaction (HOR) than Pt@C/C $H_2$ by including a more densely-modified carbon layer by the carbon healing effect. In addition, Pt@C/C CO5%/Ar95% that is manufactured by the heat-treatment in the mixed gas atmosphere, including the very small amount of carbon monoxide to clearly check the carbon healing effect by carbon monoxide, shows an intermediate level of activity in the oxygen reduction reaction or the hydrogen oxidation reaction by including a carbon layer having density between those of Pt@C/C CO and Pt@C/C Ar.

Experimental Example 5: Check Electrochemical Property of Catalyst

An experiment was performed to check the electrochemical property of the catalyst. An electrochemical workstation and Autolab equipment were used. An evaluation on the catalyst activity in the electrochemical hydrogen oxidation reaction was performed using the electrolyte including 0.1 M of $HClO_4$ saturated with hydrogen at the room temperature. An evaluation on the catalyst activity in the electrochemical oxygen reduction reaction was performed using the electrolyte including 0.1 M of $HClO_4$ saturated with oxygen at the room temperature. The rotation speed of the RDE electrode was 1600 rpm and the voltage scan rate was 5 mV/s when performing the evaluation on the catalyst activity in the hydrogen oxidation reaction or the oxygen reduction reaction.

Figure 6:
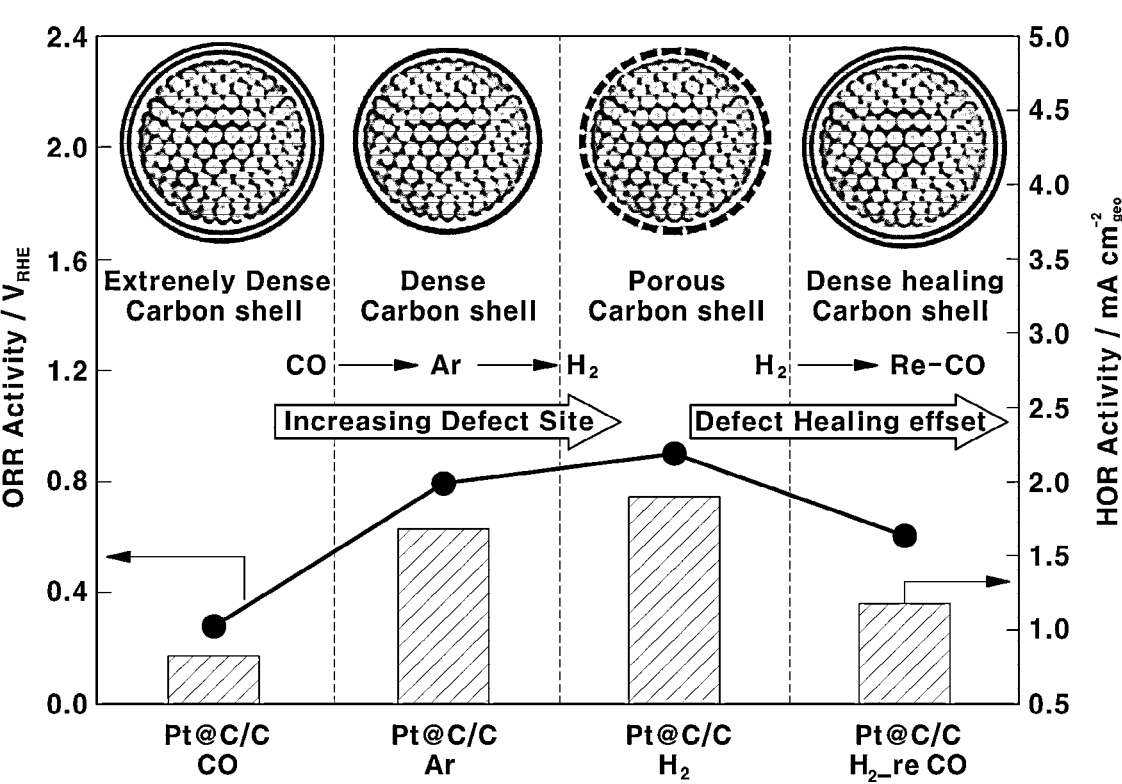
FIG. 6 shows an electrochemical property of the catalyst according to the present disclosure.

FIG. 6 shows the electrochemical property of the catalyst according to the present disclosure. Referring to FIG. 6, Pt@C/C $H_2$ shows a high level of activity in the oxygen reduction reaction or the hydrogen oxidation reaction similar to Pt/C in common use by including the porous carbon layer. Pt@C/C Ar shows the intermediate level of activity in the oxygen reduction reaction or the hydrogen oxidation reaction by including the high-density carbon layer. Pt@C/C CO shows a very low level of activity in the oxygen reduction reaction or the hydrogen oxidation reaction by including the ultra-high-density carbon layer. Pt@C/C $H_{2\_re}$CO coated again after removing the carbon layer shows similar behavior to Pt@C/C CO and shows a slightly higher level of activity in the ORR compared to in the HOR.

It may be seen that Pt@C/C CO and Pt@C/C CO5%/Ar95% are suitable because an anode catalyst is required to have the low level of activity in the ORR, between 0.6 and 1.0V, to ensure durability of the fuel cell when the fuel cell starts up/stops. It may be seen that the activity of Pt@C/C CO5%/Ar95% in the HOR is also suitable because the HOR reacts about 103 times faster than the ORR. Thus, a slight decrease in the activity does not affect the overall performance of the fuel cell although the activity of the anode catalyst in the HOR is required to drive the fuel cell.

In other words, it may be confirmed from the experimental results that the manufacturing method of catalyst according to the present disclosure may properly control the microstructure of the carbon layer by applying the various gas atmospheres in the heat-treatment process.

Therefore, the manufacturing method of the catalyst according to the present disclosure may modify the carbon layer structure by using various heat treatment gases such as inert gas (Ar), hydrogen, and carbon monoxide in the carbon layer manufacturing process, thereby optimizing the carbon layer structure according to the purpose of the metal without changing the size of the metal.

Although embodiments and experimental examples of the present disclosure have been described hereinabove, it should be understood by those of ordinary skill in the art to which the present disclosure pertains that the present disclosure may be implemented in other concrete forms without changing its technical spirit or essential features. Therefore, it should be understood that the embodiments described above are illustrative rather than being restrictive in all aspects.

What is claimed is:

1. A method of manufacturing a catalyst for a fuel cell, the method comprising:
   (A) obtaining a component including a support and an active metal supported on the support; and
   (B) obtaining a catalyst by heat-treating the component in a gas atmosphere, wherein the gas atmosphere comprises carbon monoxide (CO), and
   wherein the catalyst comprises the support, the active metal supported on the support, and a carbon layer coated on a surface of the active metal.

2. The method of claim 1, wherein the gas atmosphere is a mixed gas atmosphere further comprising argon.

3. The method of claim 2, wherein the mixed gas atmosphere comprises argon and carbon monoxide at a volume ratio in a range of 90:10 to 99:1.

4. The method of claim 1, wherein operation (B) comprises:
   (B-1) primarily heat-treating the component in the gas atmosphere comprising inert gas, hydrogen ($H_2$), carbon monoxide (CO), or any combination thereof; and
   (B-2) secondarily heat-treating the primarily heat-treated component in the gas atmosphere comprising inert gas, hydrogen ($H_2$), carbon monoxide (CO), or any combination thereof,
   wherein one or more of the gas atmospheres of operation (B-1) and (B-2) is carbon monoxide.

5. The method of claim 4, wherein the gas atmosphere of operation (B-1) is a mixed gas atmosphere of nitrogen and hydrogen, and wherein the gas atmosphere of operation (B-2) is carbon monoxide.

6. The method of claim 5, wherein the mixed gas atmosphere of (B-1) comprises nitrogen and hydrogen at a volume ratio in a range of 80:20 to 95:5.

7. The method of claim 1, wherein the catalyst has a particle diameter in a range of 3 nm to 5 nm obtained from Scherrer's equation by using a half width of a peak with respect to a plane 220 of an X-ray diffraction spectrum.

8. The method of claim 1, wherein the catalyst has an exposed metal surface area (EMSA) in a range of 0.1 $m^2/g_{pt}$ to 25 $m^2/g_{pt}$.

9. The method of claim 1, wherein the catalyst has catalyst activity in an oxygen reduction reaction (ORR) in a range of 0.1V to 0.7V based on −1.5 $mA/cm^2_{geo}$.

10. The method of claim 1, wherein the catalyst has mass activity in a hydrogen oxidation reaction (HOR) in a range of 0.5 $mA/cm^2_{geo}$ to 2.0 $mA/cm^2_{geo}$ based on 0.02V.

\* \* \* \* \*